Sept. 4, 1962 F. W. ROBERTS ET AL 3,052,762

BACKSPACING APPARATUS FOR TRANSCRIBING MACHINES

Filed Aug. 3, 1959 3 Sheets-Sheet 1

INVENTORS
Frederick W. Roberts
John R. Montgomery
Douglas B. Tiffany
BY
Curtis, Morris + Safford
ATTORNEYS

BACKSPACING APPARATUS FOR TRANSCRIBING MACHINES

Filed Aug. 3, 1959 3 Sheets-Sheet 2

INVENTORS
Frederick W. Roberts
John R. Montgomery
Douglas B. Tiffany
BY
Curtis Morris & Safford
ATTORNEYS Sept. 4, 1962 F. W. ROBERTS ET AL 3,052,762

BACKSPACING APPARATUS FOR TRANSCRIBING MACHINES

Filed Aug. 3, 1959 3 Sheets-Sheet 3

INVENTORS
Frederick W. Roberts
John R. Montgomery
Douglas B. Tiffany
BY
Curtis, Morris + Safford
ATTORNEYS

United States Patent Office 3,052,762
Patented Sept. 4, 1962

3,052,762

BACKSPACING APPARATUS FOR TRANSCRIBING MACHINES

Frederick W. Roberts, Fairfield, John R. Montgomery, Bridgeport, and Douglas B. Tiffany, Monroe, Conn., assignors to Dictaphone Corporation, Bridgeport, Conn., a corporation of New York Filed Aug. 3, 1959, Ser. No. 831,249
5 Claims. (Cl. 179—100.2)

This invention relates to sound recording and reproducing equipment used by a secretary or stenographer in transcribing messages from a sound record. More in particular, this invention relates to improved means for repeatedly reproducing selected portions of the recorded material so that the transcribing secretary may more readily determine the exact wording of the message.

Various types of arrangements have been developed in the past for enabling a secretary to repeat portions of a dictated message, and these are commonly referred to as "backspacing" arrangements. For example, in transcribing machines used with "area" type sound records such as belts or discs, means generally are provided for shifting the machine carriage back a short distance to permit the reproducing head to rescan a portion of the record. In transcribing machines used with "linear" records such as magnetic tape, on the other hand, the record may be driven in reverse direction for a short distance and then driven forward again to repeat part of the record.

During transcription operations, it sometimes is necessary for the transcribing secretary to hear a particular word or phrase repeated a number of times before she is able to determine the exact wording. Conventional backspacing arrangements are not suited for such repetitive reproduction because of the amount of time and effort required to backspace the machine for each playback of the message portion in question. Moreover, in conventional transcribing machines used with relatively large area-type records, it is not readily possible to repeat only a short portion of the recording such as a word or two; that is, in such transcribing machines the carriage must be shifted back a distance at least equal to the width of the sound track on the record, and thus the machine will repeat at least the amount of dictated material contained in one complete revolution of the record.

In accordance with the present invention, these difficulties are avoided by a transcribing system wherein the voice signals being played back to the secretary from a transcribing or reproducing machine are fed to a "message storage" device arranged to store only the last word or so heard by the secretary. In the particular embodiment described herein, this storage device consists of a rotating drum carrying on its periphery a strip of magnetizable material adapted to receive sound impressions from a magnetic transducing head. When the secretary desires to repeat the last few words heard from the reproducing machine, a foot switch is operated to cause the message portion stored on the drum to be fed out to a loudspeaker (or earpiece). As long as the switch is held in operated position, the drum rotates continuously so as to repetitively reproduce the word or words stored on the drum. Thus, without wasting any time with unnecessary manipulation of the machine, the secretary may listen to these particular words as many times as is necessary to determine the exact phrasing of the message. The magnetic drum can readily be arranged to store relatively small portions of the message, thereby affording a further saving in time as compared to conventional carriage backspace arrangements.

Accordingly, it is an object of this invention to provide transcribing apparatus that is superior to such apparatus provided heretofore. It is a further object of this invention to provide improved "backspacing" equipment that is efficient in operation and that enables the transcribing secretary to determine quickly the precise wording of a recorded message. Other objects, aspects and advantages of the invention will be in part pointed out in, and in part apparent from, the description hereinbelow considered together with the accompanying drawings. These drawings, along with this specification and claimed subject matter, disclose the best mode contemplated in applying the principles of the invention and understanding the problems discovered as well as the new results achieved. Since these teachings may suggest structural changes to others, it is apparent that later modifications may well be equivalents and thus the same in spirit as this invention, as understood by a comparison thereof with the prior art. In the drawings:

Figure 1:
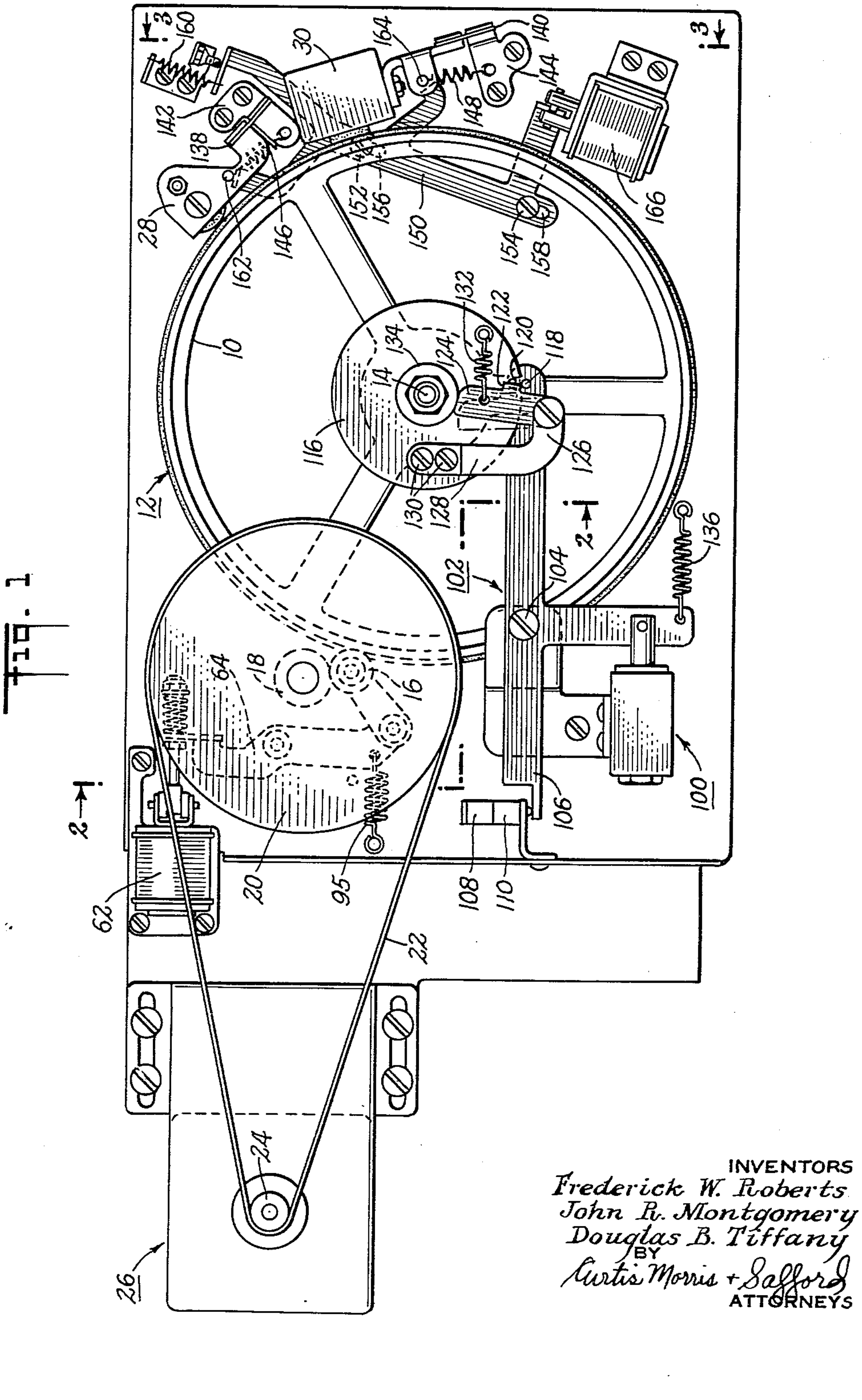
FIGURE 1 is an elevation view, partly broken away, showing the drum storage unit which receives electrical sound signals from a conventional reproducing machine.

Referring now to FIGURE 1, the backspacing apparatus includes message storage means comprising a drum 10 having on its periphery a strip of rubber, generally indicated at 12, which is impregnated with magnetizable material. This drum is rotatably mounted on a shaft 14, and is driven counterclockwise by a retractable puck 16 (see also FIGURE 2) which is engaged with the spindle 18 of a pulley 20. This pulley, in turn, is rotated by a belt 22 coupled to the shaft 24 of an electric motor generally indicated at 26.

Mounted adjacent the upper right-hand corner of the rotating drum 10 is a transducing head 28 which serves the dual functions of recording and reproducing. During normal transcribing operations, this head is connected to the output of the reproducing machine (not shown in FIGURE 1) being listened to by the secretary, so that the reproduced message will be recorded on the drum. Adjacent the transducing head is an erase head 30 which serves to "clear" the magnetic strip 12 just before it moves under the transducing head 28. Thus, at all times the drum will carry around its periphery a message segment consisting of the last portion of the material being transcribed by the secretary. In the particular embodiment described herein, the drum takes 2.44 seconds to make one revolution; however, the message segment on the drum actually is only 2.25 seconds long, due to the "silent" space between the heads 28 and 30. Turning now to the left-hand portion of FIGURE 5, a conventional reproducing machine is generally indicated at 32 and is pictorially shown as including a magnetic belt record 34 mounted on rotatable mandrels 36, 38. This record is engaged by a reproducing head 40 mounted on the usual carriage (not shown) which is traversed laterally with respect to the surface of the belt by a lead screw 42. The lead screw is rotated by a drive mechanism including a solenoid-operated clutch 44 and a motor 46. The output of the clutch also is coupled to the lower mandrel 36 by a motion-transmitting arrangement diagrammatically indicated at 48, so as to rotate the record relative to the reproducing head. Thus the reproducing head picks up the dictated message previously recorded in helical sound tracks on the belt record.

Figure 5:
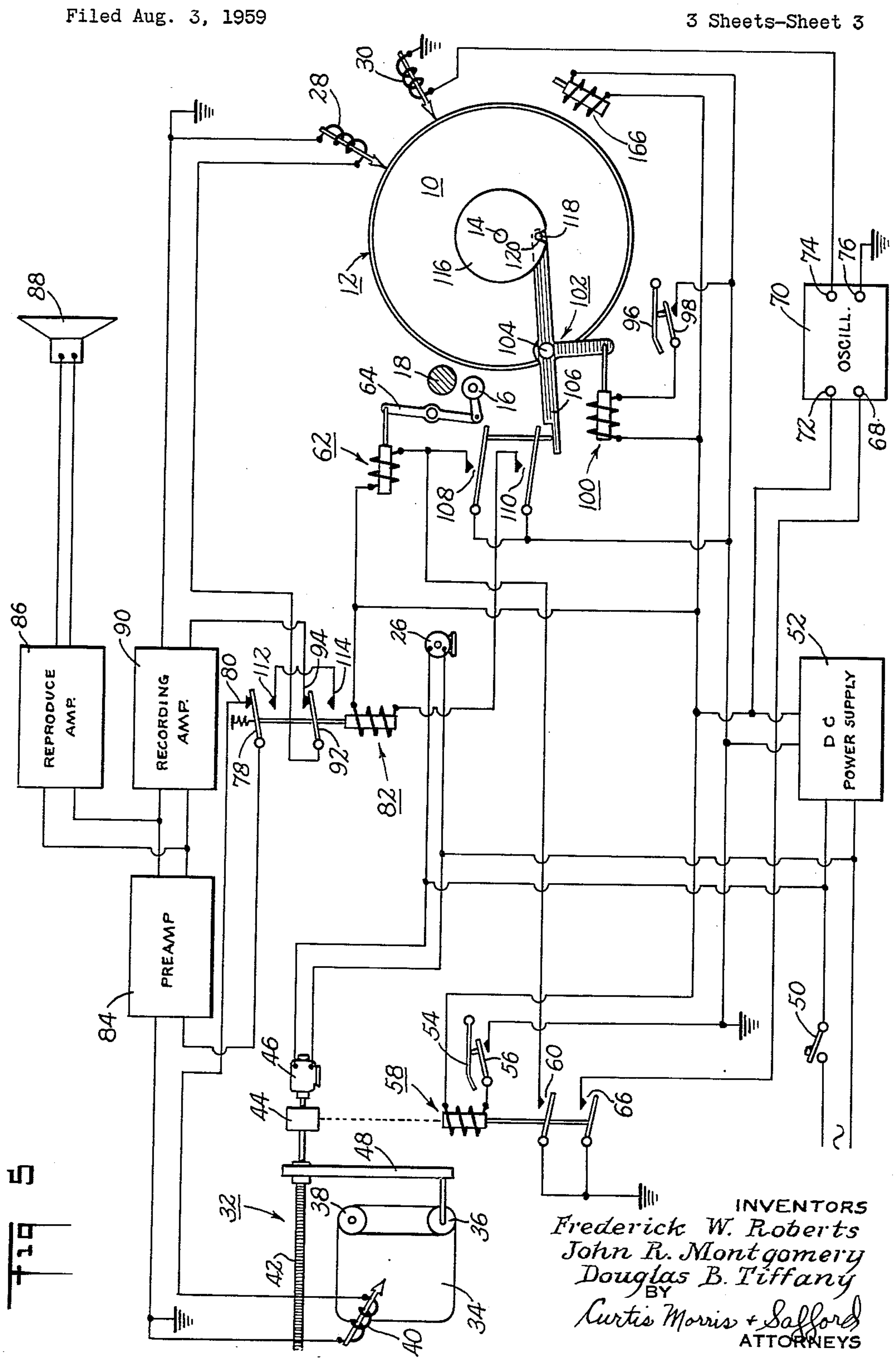
FIGURE 5 is a pictorial schematic wiring diagram, showing the control circuitry for the system.

The transcribing system is conditioned for operation by closing a main power switch 50, shown in the lower left-hand corner of FIGURE 5, which supplies A.-C. current to a D.-C. power supply 52 as well as to motors 26 and 46. To commence normal transcribing operations, the secretary presses a playback foot treadle 54 (shown directly beneath motor 46) which closes a switch 56 to energize a clutch solenoid 58 by current from power supply 52. Actuation of this clutch solenoid pulls in clutch 44 which rotates the record 34 and at the same time drives the reproducing head 40 across this record.

Actuation of clutch solenoid 58 also closes switch contacts 60 to supply current from the power supply 52 to a puck solenoid 62 which operates, through a link 64, to shift puck 16 into drive position and thus rotate drum 10. At the same time, the clutch solenoid closes switch contacts 66 to connect terminal 68 of an erase oscillator 70 to ground. This grounding connection completes the energizing circuit from power supply 52 to terminals 68 and 72 of the oscillator, and the oscillator thereupon feeds a high-frequency signal from its output terminals 74 and 76 to erase head 30. By these means the magnetic layer 12 is cleared of recorded signals just before it passes under the transducing head 28.

The signals developed by the reproducing head 40 are coupled, through contacts 78 and 80 of a backspace solenoid 82, to the input of a preamplifier 84. The output of this preamplifier is fed to a reproduce amplifier 86 which drives a loudspeaker 88 from which the transcribing secretary hears the message recorded on the belt record 34. The output of the preamplifier 84 also is coupled to a recording amplifier 90 which feeds corresponding electrical signals, through contacts 92 and 94 of backspace solenoid 82, to the transducing head 28 adjacent drum 10. Thus the message reproduced by the loudspeaker 88 is at the same time continuously recorded on the magnetic strip 12 of the drum.

When the secretary desires to repeat a portion of the dictated message, she first releases playback treadle 54 to deactuate the clutch 44 and turn off oscillator 70. The puck solenoid 62 also is deenergized, and the puck 16 is pulled away from the drum by a spring 95 (FIGURE 1). The drum bearings are arranged (by conventional means not shown herein) to provide a relatively light frictional restraint on rotation of the drum, this friction being just sufficient to assure that the drum stops effectively immediately after the puck has been disengaged.

The secretary next presses a backspace treadle 96 (shown immediately beneath drum 10) which closes a switch 98 to connect the output of power supply 52 to an indexing solenoid 100. Actuation of this solenoid shifts a T-shaped link 102 clockwise about its pivot 104, and the left-hand arm 106 of this link moves up to close a pair of switch contacts 108 and 110. Contacts 108 connect the output of power supply 52 to puck solenoid 62, so as to return puck 16 to drive position and restart drum 10 rotating. Contacts 110 connect the output of power supply 52 to energize the backspace solenoid 82.

With the backspace solenoid energized, movable contacts 78 and 92 are pulled down onto fixed contacts 112 and 114 respectively, and the transducing head 28 thereby is connected to the input of the preamplifier 84. Consequently, as the drum rotates, the message segment on strip 12 is continuously repeated through loudspeaker 88, and thus the secretary may listen to this segment as many times as is required to determine the exact wording. During this time, the oscillator 70 is deenergized so that the message segment will not be erased.

When the transcribing secretary releases the backspace treadle 96, the solenoid 100 will be deenergized and drum 10 will stop. In order that the next portion of message to be recorded on the drum will follow sequentially after the segment already on the drum, it is necessary for the drum to be stopped at its initial starting position (i.e. its position when backspace treadle 96 was first pressed). A "floating index" mechanism is provided for this purpose as will now be described.

Figures 2, 3, 4:
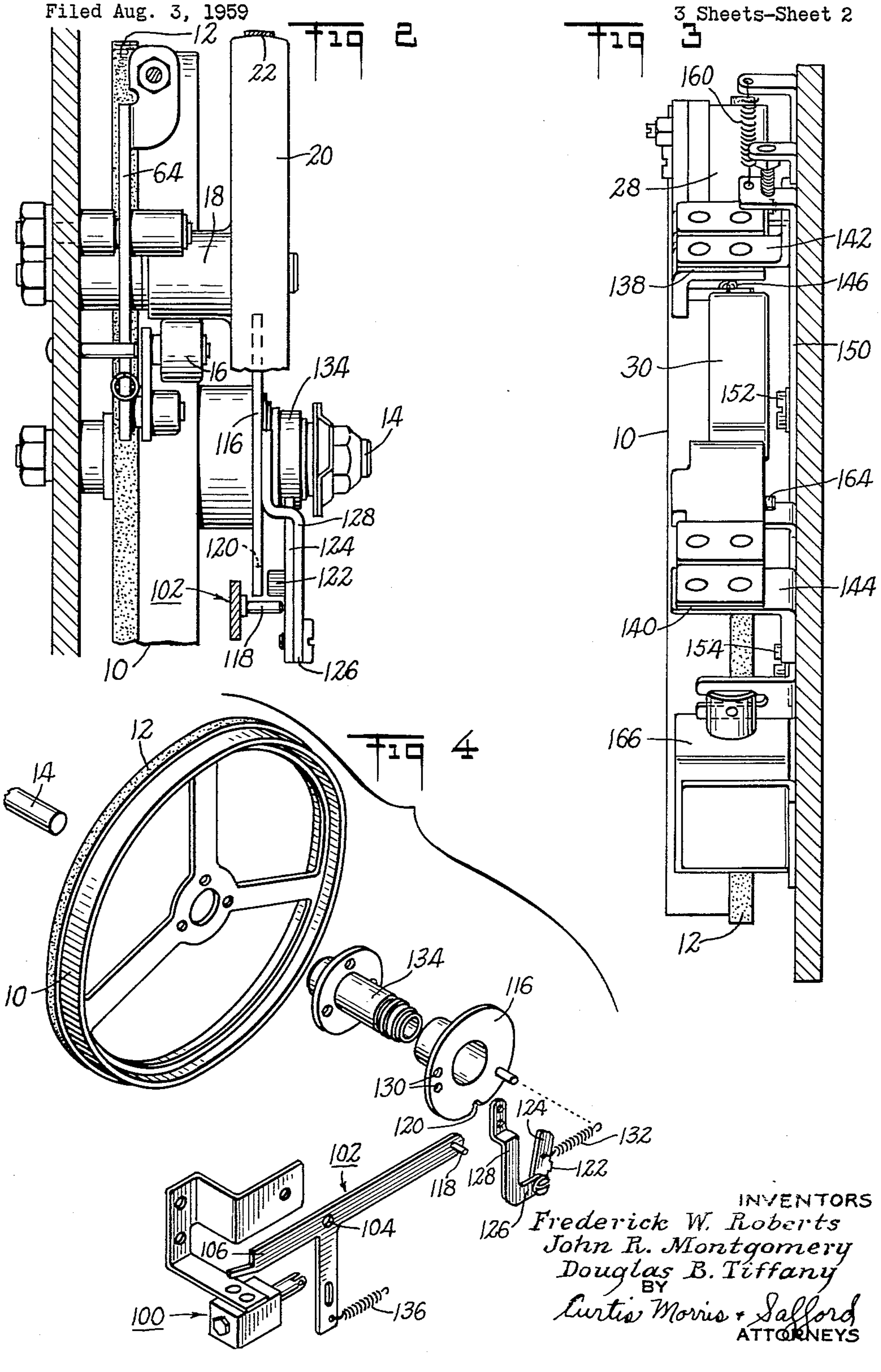
FIGURE 2 is a cross-section taken along line 2—2 of FIGURE 1, showing certain aspects of the floating index mechanism used to establish the "start" position of the drum.
FIGURE 3 is a cross-section taken along line 3—3 of FIGURE 1, showing the supporting structure for the magnetic heads.
FIGURE 4 is an exploded perspective view showing details of the floating index mechanism.

Referring to FIGURES 4 and 5, rotatably mounted on the drum shaft 14 is an indexing member consisting of a disc 116. During normal transcription operations (i.e. with playback treadle 54 depressed), this disc is prevented from rotating by an index pin 118 which is carried on the right-hand arm of T-link 102 and extends through a radial slot 120 in the disc. This pin is arranged to engage a finger 122 (see also FIGURE 1) formed on the side of a pawl 124, and the pawl in turn is pivoted on the lower end 126 of a lever 128 which is screwed to the disc 116 at 130. A spring 132 urges the pawl clockwise about its pivot towards contact with a sleeve 134 integral with shaft 14, but during normal transcription operations the pin 118 is in the slot 120 and thus engages the finger 122 to hold the upper end of the pawl away from the sleeve 134.

During the backspacing operation, the indexing solenoid 100 is energized as described above, and the consequent clockwise rotation of the T-link 102 shifts the pin 118 out of the slot 120. The pawl 124 thus is pressed into engagement with the sleeve 134 by spring 132 (as shown in solid outline in FIGURE 1), and the frictional seizure between the pawl and the sleeve effectively locks the disc 116 to the sleeve. Therefore, the disc will be carried along with the drum 10 while it rotates during the backspacing operation.

When the secretary releases the backspace treadle 96 and thereby deenergizes the indexing solenoid 100, a spring 136 urges the T-link 102 in a counterclockwise direction. If the slot 120 is at this time directly opposite the pin 118, the T-link will rotate counterclockwise and the pin will enter the slot. Thus, switch contacts 108 and 110 will be opened so that the drum will stop immediately. Normally, of course, the slot will not be directly opposite the pin when the backspace treadle is released, and in that event the pin will merely be pressed against the periphery of the disc 116 while it continues to rotate. Consequently, the switch contacts 108 and 110 will remain closed and the drum will be rotated by puck 16 until the slot 120 comes alongside pin 118, at which time the pin will be shifted into the slot and the switch contacts 108 and 110 will open to deenergize the drum. Accordingly, the drum will always be stopped at its initial starting position.

Referring now to FIGURES 1 and 3, transducing head 26 and erase head 28 are supported on respective flexible strips 138 and 140 secured to respective brackets 142 and 144, and are urged towards the drum 10 by corresponding springs 146 and 148. When the transcribing apparatus is not activated for use, these heads are automatically shifted away from contact with the rubber strip 12 by means of a lift lever 150. This lever is movably secured to the frame of the machine by pins 152, 154 which extend through respective slots 156, 158 in the lever, and a spring 160 urges the lever up against corresponding shoulders 162 and 164 on the heads 26 and 28 to move the heads away from the drum. When the main power switch 68 is closed, the output of the power supply 52 energizes a lift solenoid 166 which pulls lever 150 down away from the heads 26, 28 thereby permitting these heads to be pressed against drum 10 by the action of springs 146 and 148.

We claim:

1. A reproducing system adapted for use in transcribing speech material and the like, comprising reproducing apparatus having a record and means operable therewith for developing output signals corresponding to the message material on the record; backspacing apparatus including message storage means for receiving and storing the signals as they are developed from said record, clearing means normally coupled to said message storage means to eliminate therefrom all portions of said signals except those falling within an immediately preceding period of time; playback means operable with said message storage means to repeatedly reproduce the message segment stored in said message storage means, control means for deactivating said clearing means while said playback means is functioning, and indexing means operable after any complete playback of the stored message segment to condition said message storage means to store the next signals received from said record immediately after the end of the previously stored message portion, thereby to provide continuity of the stored message segment at all times.

2. A reproducing system adapted for use in transcribing speech material and the like, comprising reproducing apparatus having a sound record and means operable with the record for developing output signals corresponding to the message material on the record; backspacing apparatus including a recording strip and a relatively movable transducing means for storing on said strip the signals developed from said sound record, erase means normally coupled to said strip adjacent said transducing means to clear the previously recorded signals from said strip; playback means operable upon activation thereof to repeatedly reproduce the message segment stored in said strip, control means for deactivating said erase means while said playback means is functioning, and indexing means operable after any complete playback of the stored message segment to assure that said transducing means and said strip take the same relative position as at the start of the playback operation, thereby to provide continuity of the stored message segment at all times.

3. Apparatus for use in temporarily storing and selectively playing back short segments of recorded material, said apparatus comprising a rotatably mounted drum adapted to carry a recorded message segment, a drive motor for rotating said drum, an indexing member coaxially mounted adjacent said drum for independent movement with respect thereto, indexing lever means movably supported adjacent said indexing member, said lever means and said indexing member being provided with cooperable means adapted to be engaged in a predetermined position of said member, a start control for said drive motor and operable by said lever means when said lever means has been moved away from engagement with said indexing member, and locking means automatically operable when said lever means has been moved away from engagement with said indexing means, said locking means serving to couple said indexing member to said drum, whereby said indexing member rotates with said drum to maintain said drive motor energized until said drum has returned to its initial starting position.

4. Apparatus as claimed in claim 3, wherein said indexing member comprises a disc, said cooperable means including a slot in the periphery of said disc and a corresponding pin on said lever means, and spring means urging said pin towards the periphery of said disc.

5. Apparatus as claimed in claim 3, wherein said lever means comprises a rotatably-mounted T-link, one arm of said T-link being engageable with said indexing member, the other arm of said T-link including means to energize said drive motor when said one arm has been disengaged from said indexing member, said start control being operable to rotate said T-link out of engagement with said indexing member.

References Cited in the file of this patent

UNITED STATES PATENTS

| | | |
|---|---|---|
| 2,336,777 | Clausen | Dec. 14, 1943 |
| 2,673,242 | Van Deventer | Mar. 23, 1954 |
| 2,883,476 | Dermond et al. | Apr. 21, 1959 |
| 2,921,991 | Sher | Jan. 19, 1960 |
| 2,994,745 | Schenkel | Aug. 1, 1961 |

FOREIGN PATENTS

| | | |
|---|---|---|
| 730,664 | Great Britain | May 25, 1955 |